United States Patent [19]

Benzinger et al.

[11] 4,384,047

[45] May 17, 1983

[54] POROUS VINYLIDENE FLUORIDE POLYMER MEMBRANE AND PROCESS FOR ITS PREPARATION

[75] Inventors: William D. Benzinger, Eastown Township, Chester County; Donald N. Robinson, Collegeville, both of Pa.

[73] Assignee: Pennwalt Corporation, Philadelphia, Pa.

[21] Appl. No.: 341,956

[22] Filed: Jan. 22, 1982

Related U.S. Application Data

[63] Continuation of Ser. No. 135,034, Mar. 28, 1980, abandoned.

[51] Int. Cl.³ .......................... B29D 27/04; C08J 9/28
[52] U.S. Cl. ................................. 521/64; 210/500.2; 264/41; 521/62
[58] Field of Search ....................... 264/41, 49; 521/64, 521/62, 63; 210/500.2

[56] References Cited

U.S. PATENT DOCUMENTS

| | | | |
|---|---|---|---|
| 3,607,329 | 9/1971 | Manjikian | 264/49 X |
| 3,615,024 | 10/1971 | Michaels | 264/41 X |
| 3,642,668 | 2/1972 | Bailey et al. | 264/41 X |
| 3,817,772 | 6/1974 | Heit | 264/49 X |
| 3,948,823 | 4/1976 | Lee et al. | |
| 4,188,354 | 2/1980 | Munari et al. | 264/41 X |
| 4,203,847 | 5/1980 | Grandine | 264/41 X |
| 4,203,848 | 5/1980 | Grandine | 264/41 X |
| 4,238,571 | 12/1980 | Mano et al. | 264/41 X |

FOREIGN PATENT DOCUMENTS 2735443 10/1976 Fed. Rep. of Germany .

*Primary Examiner*—Philip E. Anderson

[57] ABSTRACT

Vinylidene fluoride polymer ultrafiltration membranes are prepared by casting a sheet of said polymer dissolved in a mixture of a specified solvent and a specified non-solvent, on a smooth substrate, evaporating a portion of the solvent from the sheet, immersing said sheet in a gelation liquid therefore, and optionally, stabilizing the gelled sheet by heat treatment thereof. A porous vinylidene fluoride polymer membrane having smooth, unwrinkled surfaces can be prepared in accordance with the above described process without restraining the membrane during the evaporation and gelation steps by utilizing triethyl phosphate as the solvent.

12 Claims, No Drawings

POROUS VINYLIDENE FLUORIDE POLYMER MEMBRANE AND PROCESS FOR ITS PREPARATION

This application is a continuation of application Ser. No. 135,034, filed Mar. 28, 1980 now abandoned.

BACKGROUND OF THE INVENTION

The Problem

Methods for preparing membranes containing pores of dimensions useful for filtering out substances of various sizes, including salts in solution and viruses, are known. However, none of these disclosed methods has been found to be satisfactory for preparing membranes of vinylidene fluoride polymer having a pore size range suitable for ultrafiltration. Furthermore, known solvent casting methods of forming porous vinylidene fluoride polymer sheets require that the sheets be held under restraint during the forming process to avoid uneven shrinkage causing a wrinkled, rough-surfaced product.

DESCRIPTION OF THE PRIOR ART

Methods for preparing porous membranes and the resulting products are disclosed, for example, in U.S. Pat. Nos. 3,133,132; 3,567,810; 3,607,329; 3,615,024; 3,642,668; 3,817,772; 3,948,823; and 4,069,151; Japanese Pat. Nos., 49-126,572; and 51-072,063; and German Offen. No. 2,735,443. Some of these disclosures are directed, at least in part, to the formation of porous vinylidene fluoride polymer sheets. Of the above mentioned references, the Michaels U.S. Pat. No. 3,615,024 is one of the most pertinent with respect to the process of this invention. Michaels discloses a process for making a porous polymer membrane by casting a solvent-diluent dope of the polymer on a surface, leveling the membrane for about a minute, thereafter washing preferentially one surface of the membrane with a diluent liquid such as water or methyl alcohol, and then replacing all of the solvent with the diluent. Polyvinylidene fluoride is mentioned as a polymer from which membranes may be prepared in accordance with the disclosure although there is no specific working example of its use. Solvents such as dimethyl formamide, dimethyl acetamide, dimethyl sulfoxide and N-methyl pyrrolidone are disclosed as suitable solvents for certain polymers used in the working examples. The product of the Michaels process is disclosed to be an asymmetric membrane having a thin porous layer or "skin" having pores ranging in size of from 1.0 to 1000 millimicrons. The skin is supported on a much thicker layer through which fluid can pass with little hydraulic resistance.

STATEMENT OF THE INVENTION

This invention relates to a smooth, unwrinkled, porous, polymer membrane of vinylidene fluoride homopolymer or a copolymer of at least 70 weight percent vinylidene fluoride and up to 30 weight percent of tri- or tetrafluoroethylene, said membrane prepared by casting on a smooth solid surface a solution consisting of from about 12 to about 34 weight percent of said polymer, about 65 to 80 weight percent of triethyl phosphate and about 1 to about 10 weight percent of a nonsolvent for said polymer selected from the group consisting of glycerol, ethylene glycol and phosphoric acid, and, in the absence of physical restraint on the cast membrane, immersing it in a gelation medium therefor.

This invention also relates to a process for preparing ultrafiltration membranes of a resinous polymer material selected from the group consisting of (a) vinylidene fluoride homopolymer, (b) copolymer of at least 70 weight percent vinylidene fluoride and up to 30 weight percent of tri- or tetrafluoroethylene and (c) a blend of no less than about 75 weight percent of either (a) or (b) with no greater than about 25% of a thermoplastic methyl methacrylate polymer, said membrane having a surface layer containing a multiplicity of pores having a diameter within the range of from about 1 to about 100 millimicrons, and a support layer thicker than and having less resistance to fluid flow than said surface layer, said process comprising (1) casting on a smooth solid surface a solution of said polymer material having a polymer concentration of from about 12 to about 35 weight percent, about 65 to about 80 weight percent of a solvent selected from the group consisting of triethyl phosphate, hexamethyl phosphoramide, 1-methyl-2-pyrrolidinone, dimethyl acetamide, dimethyl formamide, propylene carbonate and mixtures thereof and from about 1 to about 10 weight percent of a nonsolvent for said polymer material selected from the group consisting of glycerol, ethylene glycol, and phosphoric acid and mixtures thereof, to form a sheet (2) evaporating a portion of the solvent-non-solvent from said sheet and (3) contacting the entire sheet with a liquid gelation medium therefor to form said membrane. The membrane may be dried for storage or permitted to remain in the wet gel state.

The formed membrane may also be heat stabilized before or after drying, if desired, to avoid shrinkage when used to filter heated fluids.

The preparation of porous membranes in accordance with the process of this invention and their usefulness as ultrafiltration membranes is demonstrated by the following examples.

EXAMPLE 1

A casting solution was prepared by agitating a mixture of vinylidene fluoride homopolymer powder, (KYNAR ® emulsion grade resin 301) (80 g.), glycerol (20 g.), and triethyl phosphate (300 g.) in a suction flask immersed in an oil bath at 90°–100° C. for 4 hours. Agitation was provided by a Teflon-bladed mechanical stirrer. The stirrer was then removed, and the resulting solution was degassed by partial evacuation (200–300 mm Hg.) until all bubbles had disappeared. The solution was free of visible gel particles and was clear. The concentration of glycerol in the solution was 5% by weight.

About 100 ml. of the above solution were cast on a smooth, glass plate (12×12×0.25 inch previously cleaned with chromic acid, water, and acetone) with a Gardner knife set at 40 mils (0.040 inch gate). Relative humidity above the casting surface was 65%. After 5 minutes, during which time a portion of the solvent non-solvent mixture had evaporated, the plate and cast film were immersed in a gelation bath, consisting of a mixture of about 10 liters of tap water and ice, for 30 minutes. The membrane formed and floated free of the glass during this time. It was then placed in a bath of warm tap water (50° C.) for 5 minutes. The membrane then was stored in distilled water at ambient temperature. At no time during the above steps of forming the membrane was it held or fastened to restrain it from shrinking unevenly. The membrane formed by this process was smooth and unwrinkled.

The above produced membrane was evaluated in an Amicon TCF 10 Thin-Channel Ultrafiltration System, using water, Blue Dextran solution, and polyethylene glycol ("Carbowax") solutions. Data are shown in Table 1.

EXAMPLES 2-7

The same general procedure was used as in Example 1 except for the glycerol concentration, which was varied from 1 to 8%. Test results are compared in Table 1.

TABLE 1

| Example | Glycerol Conc'n. (%) | Feed* | Retention (%) | Flux** (ml/cm²/min.) |
|---|---|---|---|---|
| 2 | 3 | BD | ≧98 | 0.01 |
|   |   | H₂O | — | 0.01–0.02 |
|   |   | C-20 | >98 | 0.01 |
|   |   | C-6 | >95 | 0.01–0.02 |
| 1 | 5 | C-1 | 20–35 | 0.02 |
|   |   | BD | ≧98 | 0.02–0.08 |
|   |   | H₂O | — | 0.04–0.1 |
|   |   | C-20 | ≧98 | 0.01–0.03 |
|   |   | C-6 | 70–90 | 0.03–0.05 |
| 3 | 6 | C-1 | 4–30 | 0.04–0.05 |
|   |   | BD | ≧98 | 0.06–0.1 |
|   |   | H₂O | — | 0.1–0.2 |
|   |   | C-20 | 82–89 | 0.02–0.04 |
| 4 | 7 | BD | ≧98 | 0.2 |
|   |   | H₂O | — | 0.3–0.5 |
|   |   | C-20 | 68–79 | 0.05–0.06 |
|   |   | C-6 | 0 | 0.3 0.5 |
| 5 | 8 | BD | 90 | 0.05–0.1 |
|   |   | H₂O | — | 0.3–0.6 |
|   |   | C-20 | 70–78 | 0.02–0.05 |
| 6 | 2 | H₂O | — | 0.005–0.007 |

TABLE 1-continued

| Example | Glycerol Conc'n. (%) | Feed* | Retention (%) | Flux** (ml/cm²/min.) |
|---|---|---|---|---|
|   |   | C-1 | 51–76 | 0.005 |
|   |   | H₂O | — | 0.005 |
|   |   | C-6 | 64–92 | 0.003 |
|   |   | BD | >98 | 0.004 |
| 7 | 1 | H₂O | — | <0.001 |

*BD = 0.1% Aqueous Blue Dextran 2000 Solution (M.W. 2,000,000)
C-20 = 1% Aqueous Carbowax 20M solution (M.W. 15,000–20,000)
C-6 = 1% Aqueous Carbowax 6000 solution (M.W. 6000)
C-1 = 1% Aqueous Carbowax 1000 solution (M.W. 1000)
**Flux and retention at 30 psig. For Example 6 and 7, flux and retention at 150 psig.

EXAMPLES 8-12

The same general procedure was used as in Example 1 except for the solvent employed. Test results are compared in Table 2.

TABLE 2

| EXAMPLE | SOLVENT | Blue Dextran* Flux | Blue Dextran* Retention | H₂O Flux** | CARBOWAX 20M*** Flux | CARBOWAX 20M*** Retention |
|---|---|---|---|---|---|---|
| 8 | Hexamethyl Phosphoramide | 0.08–0.09 | >98% | 0.1 |   |   |
| 1 | Triethyl Phosphate | 0.02–0.08 | >98% | 0.04–0.1 | 0.01–0.03 | ≧98% |
| 9 | 1-Methyl-2-Pyrrolidinone | 0.03 | >98% | 0.1 |   |   |
| 10 | Dimethyl Acetamide | 0.02–0.03 | >98% | 0.05 |   |   |
| 11 | Dimethyl Formamide | 0.006 | >98% | 0.01 | 0.004 | 98% |
| 12 | Propylene Carbonate | 0.1 | 80–85% | 0.25 |   |   |

*0.1% Blue Dextran 2000 aqueous solution feed.
Flux in ml/cm²/min. at 30 psig.
**Water flux in ml./cm²/min. at 30 psig.
***1% aqueous solution of Carbowax 20M feed.
Flux in ml/cm²/min. at 30 psig.

EXAMPLES 13-20

A comparison of some other non-solvents in the casting solution is set forth in the following table.

TABLE 3

| Example* | Non-Solvent | Feed | Pressure | Retention | Flux |
|---|---|---|---|---|---|
| 13 | Glycerol | BD | 30 psig | >98% | 0.02–0.08 ml/cm²/min. |
|   |   | H₂O | " | — | 0.04–0.1 |
|   |   | C-20 | " | ≧98 | 0.01–0.03 |
| 14 | Phosphoric Acid | BD | " | >98 | 0.06–0.07 |
|   |   | H₂O | " | — | 0.1 |
|   |   | C-20 | " | >98 | 0.03–0.04 |
| 15 | Ethylene Glycol | BD | " | ≧95 | 0.01 |
|   |   | H₂O | " | — | 0.01 |
|   |   | C-20 | " | >98 | 0.005–0.008 |
| 16 | Pentaerythritol | BD | " | >98 | 0.001 |
|   |   | H₂O | " | — | 0.001 |
|   |   | H₂O | 100 | — | 0.04 |
|   |   | H₂O | 125 | — | 0.07 |
| 17 | Citric Acid | BD | 30 | >98 | <0.001 |
|   |   | H₂O | 30 | — | <0.001 |
|   |   | H₂O | 125 | — | <0.001 |
| 18 | Bis-Phenol A | H₂O | 30 | — | <0.001 |
|   |   | H₂O | 125 | — | <0.001 |
| 19 | Acetic Acid | H₂O | 30 | — | <0.001 |
| 20 | Ethyl Acetoacetate | H₂O | 100 | — | <0.001 |

*Membranes were made with 20% vinylidene fluoride homopolymer, 5% non-solvent, and 75% triethyl phosphate in the casting solution. Other conditions are described in Example 1.

EXAMPLES 21-23

Vinylidene fluoride—tetrafluoroethylene copolymer resins having the monomer weight percentages reported in the table below were cast as generally described for Example 1 except that solution concentrations were at either 20 or 30 weight percent as reported below and heat stabilization of the membrane was omitted. The ultrafiltration data for these membranes is given in the following table.

TABLE 4

| Example | Composition VF$_2$/TFE | Casting Solution, Conc'n. Polymer | Casting Solution, Conc'n. Glycerol | Test Feed | Membrane Evaluation Retention % | Membrane Evaluation Flux (ml/cm$^2$/min) | Pressure (psig) |
| --- | --- | --- | --- | --- | --- | --- | --- |
| 21 | 95/5 | 20% | 5% | H$_2$O | — | 0.02–0.07 | 30 |
|  |  |  |  | BD | >98 | 0.004–0.015 | ↓ |
|  |  |  |  | H$_2$O | — | 0.008–0.02 | ↓ |
|  |  |  |  | C-20M | 99 | 0.003–0.008 | ↓ |
|  |  |  |  | H$_2$O | — | 0.007–0.03 | ↓ |
| 22 | 70/30 | 20% | 5% | Poor Quality, Not Tested |  |  |  |
| 23 | 70/30 | 30% | 5% | H$_2$O | — | 0.001 | 30 |
|  |  |  |  | H$_2$O | — | 0.002–0.003 | 150 |

EXAMPLES 24–26

A 20 weight percent solution of a mixture of resins consisting of 16 parts vinylidene fluoride homopolymer and 4 parts of poly(methyl methacrylate) (Lucite 140) in triethyl phosphate and containing 5 weight percent glycerol, was prepared in a manner similar to the solution preparation in Example 1. Three 40 mil. films of the solution were cast on a glass plate, the solutions allowed to evaporate at room temperature for 5 minutes and the films gelled by immersion in an ice-water bath for 30 minutes. The membranes were then stabilized by immersion in hot water (50° C.) for 5 minutes. The resulting membranes were kept wet with water, and flux and water retention properties determined at 30 psig by the procedure used in the foregoing examples. The results are shown in the following table.

TABLE 5

| Example | Water Flux | Blue Dextran Flux | Blue Dextran Retention | Water Flux | C-20 Flux | C-20 Retention |
| --- | --- | --- | --- | --- | --- | --- |
| 24 | 0.16 | 0.03 | >98 | 0.06 | 0.02 | 94 |
| 25 | 0.10 | 0.03 | >98 | 0.03 | 0.05 | 34 |
| 26 | 0.11 | 0.03 | >98 | 0.06 | 0.02 | 94 |

EXAMPLE 27

To demonstrate that vinylidene fluoride polymers produced by a suspension polymerization process are also useful for this invention, a casting solution was prepared by agitating a mixture of vinylidene fluoride homopolymer (KYNAR® grade 821, suspension grade resin), (60 g), glycerol (24 g), and triethyl phosphate (316 g) for 4 hr at 90°–95° C. Agitation was provided by a Teflon-bladed mechanical stirrer. The stirrer was then removed, and the resulting solution was degassed by partial evacuation (250–400 mm Hg) until all bubbles had disappeared. The solution was free of visible gel particles and was clear. The concentration of glycerol in the solution was 6% by weight.

A membrane was cast with this solution onto a clean, smooth glass plate with a Gardner knife set at 20 mils. After an evaporation time of 5 min, the plate and cast film were immersed in a gelation bath of iced water (2°–3° C.) for 30 min. The membrane formed and floated free of the glass during this time.

During the steps of formation of the membrane through gelation, the membrane was not taped or restrained in any way and, surprisingly provided a smooth, unwrinkled membrane product. Later, the membrane was heat stabilized for 30 min in water at 100° C.

Tests were performed on the membrane of this Example in accordance with the procedure described in Example 1 and the results are shown in the following table.

TABLE 6

| Example | Glycerol Conc'n % | Feed | Retention, % | Flux |
| --- | --- | --- | --- | --- |
| 27 | 6 | B.D. | >98 | 0.1 |
|  |  | H$_2$O | — | 0.07 |
|  |  | C-20 | 97 | 0.03 |

EXAMPLE 28

A casting solution was prepared by agitating a mixture of vinylidene fluoride homopolymer powder (120 g), glycerol (36 g), and triethyl phosphate (444 g.) for 1½ hr. at 90°–95° C. Agitation was then stopped, the mixture was allowed to cool to room temperature, and was stored overnight in a stoppered container. The following day the mixture was reheated to 90°–95° C. and agitated for an additional 1½ hr. Agitation was provided by a Teflon-bladed mechanical stirrer. The stirrer was then removed, and the resulting solution was degassed by partial evacuation (250–400 mm Hg) until all bubbles had disappeared. The solution was free of visible gel particles and was clear. The concentration of glycerol in the solution was 6% by weight.

Four membranes were cast from this solution onto 12×36 inch smooth glass plates. In all cases the temperature of the solution at the time of casting was 91°–93° C., the thickness of the cast film was 20 mils, and the relative humidity above the casting surface at the time of casting was 74%. In each case, after the cast film had been allowed to evaporate for 5 min. at ambient temperature, the plate and cast film were immersed in an iced-water gelation bath (2°–4° C.) for 30 min. The membrane formed and floated free of the glass during this time.

The membranes were stored in distilled water at ambient temperature for 12 days and then were heat treated by immersion for 30 min. in water at 95°–100° C. As soon as the membranes were removed from the hot water they were cooled to ambient temperature by immersion in a large volume of water at ambient temperature.

The wet membranes were glycerol treated by immersion in glycerol for about 30 min., then were hung verticaly by clips attached to one end to allow excess glycerol to drain off. The membranes were then allowed to dry at ambient temperature.

A spiral-wound module was prepared using two of these membranes. It was flushed with water for 30 min. to remove glycerol from the membranes, and then found to retain Blue Dextran quantitatively when tested with a 0.09% aqueous solution of Blue Dextran 2000 at 13 psig. and ambient temperature.

This module was tested for long term stability at high temperature by operation in an automated ultrafiltration unit for over a month at 186° F. (85° C.) The feed was a 0.4% solution of Elvanol T-25 (fully hydrolyzed polyvinyl alcohol from E. I. DuPont de Nemours & Co.) in deionized water. The feed solution concentration was kept constant by continuously returning the permeate to the feed tank and by adding deionized water as necessary to make up for water lost by evaporation. A pressure of 20 psig. and a feed recirculation rate of 10 gal/min. were used throughout the study.

Representative data is given below.

| Time | Flux | Retention of PVA |
|---|---|---|
| Start | 0.03 ml/cm² min. | — |
| 2 days | 0.02 | 97.2% |
| 27 days | 0.02 | 97.4% |

EXAMPLE 29

Another batch of membranes was prepared by the same general procedure as in Example 28 except for the following. Solution preparation, requiring a total of 3½ hr., and casting were done on the same day. The glycerol concentration in the casting solution was the same as in Example 28 (6% by weight). The relative humidity during casting was 69%. After gelation in iced-water, the membranes were stored in water for 3 days at ambient temperature, and then were heat treated for 30 min. in water at 95° C. The membranes were then allowed to dry in air at room temperature without prior treatment with glycerol or any other humectant or surfactant.

A spiral-wound module was prepared using two of these membranes. The module was soaked for 1½ hr. in a 1:1 mixture of isopropanol and water and then soaked in pure water overnight. It was flushed with water for about 30 min. to remove any residual alcohol and then found to retain Blue Dextran quantitatively when tested with a 0.09% aqueous solution of Blue Dextran 2000 at 13 psig. and ambient temperature.

This module was tested for long term stability at high temperature in a 0.4% solution of polyvinyl alcohol by the same procedure and under the same conditions employed in Example 28 except that the pressure was 25 psig.

Representative data is given below.

| Time | Flux | Retention of PVA |
|---|---|---|
| Start | 0.03 ml/cm² min. | 93.3% |
| 3 days | 0.02 | 97.3% |
| 7 mo. | 0.02 | 97.5% |

EXAMPLE 30

A casting solution was prepared by stirring a mixture of polysulfone resin pellets (Udel P-1700, Union Carbide Corp.) (75 g) and hexamethyl phosphoramide (425 g) for 5 hrs. at 90°–95° C. until all of the polymer was dissolved. The solution was then allowed to stand undisturbed for 15 min. at atmospheric pressure to permit air bubbles to escape. The resulting solution was clear and bubble-free.

A 10-mil film of this solution was cast onto a smooth, clean glass plate. Tape had been placed along the edges of the plate prior to casting to assure adherence of the film to the plate during subsequent processing steps. Immediately after the film had been cast the plate and cast film were placed under an electric heater at a temperature of 150° F. for 3 min. The plate and film were then removed and immersed in a water bath at ambient temperature for gelation. After 30 min. the resulting membrane was cut free of the tape, removed from the glass plate, and stored in water at ambient temperature.

The membrane was tested by the same procedure used for Example 1. Results were as follows:

| Feed | Retention | Flux | |
|---|---|---|---|
| H₂O | — | 2.1 | ml/cm² min. |
| B.D. | >98% | 0.2 | |
| H₂O | — | 0.9 | |
| C-20 | 95% | 0.07 | |

EXAMPLE 31

Vinylidene fluoride homopolymer and polysulfone membranes were prepared by procedures as illustrated in the foregoing examples.

Memebranes were characterized by measuring distilled water flux and the flux and retention of 1% Carbowax 20M solutions at 30 psi. in an Amicon TCF 10 thin-channel ultrafiltration cell. For chemical stability tests, membrane samples with known flux and retention were soaked in the specified solution or solvent for a given period (usually ~1 month) and then thoroughly rinsed with dstilled water and retested. If no significant change in flux or retention was found, the sample was returned to the chemical solution for an additional period.

Results are shown in the following tables.

TABLE 7

| Exposure Chemical | Poly(vinylidene fluoride) | | Polysulfone | |
|---|---|---|---|---|
| 1% NaOCl | 6 mo. | OK[1] | 1 mo. | failed[2] |
| | 8 mo. | failed[2] | | |
| 10% Na₂Cr₂O₇ in 96% H₂SO₄ | 1 week | OK[1] | 2 hr. | disintegrated |
| | 1.5 mo. | failed[2] | | |
| 5% Na₂Cr₂O₇ in 48% H₂SO₄ | 5 mo. | OK[1] | <2 weeks | disintegrated |
| 10% H₂O₂ | 1.5 mo. | OK[1] | 1 week | OK[1] |
| | 5 mo. | failed[2] | 1.5 mo. | failed[2] |
| 48% H₂SO₄ | 25 mo. | OK[1] | 5 mo. | OK[1] |
| 18% HCl | 25 mo. | OK[1] | | |
| 35% HNO₃ | 25 mo. | OK[1] | 5 mo. | OK[1] |
| 42% H₃PO₄ | 25 mo. | OK[1] | | |
| 10% NaOH | 1 mo. | OK[1,3] | | |
| | 3 mo. | failed[2,3] | | |
| 1% NaOH | 24 mo. | OK[3,4] | | |
| 1% Na₂CO₃ | 24 mo. | OK[1] | | |

[1]No significant change in flux or in retention of Carbowax 20M.
[2]Became brittle, cracked and chipped.
[3]Became discolored.
[4]Flux has increased and retention of Carbowax has decreased; however, ~90% of the Carbowax still retained.

TABLE 8

| Exposure Chemical | Poly(vinylidene fluoride) | | Polysulfone |
|---|---|---|---|
| 95% Ethanol | 5 mo. | OK[1] | 5 mo. membrane shrinking[2] |
| 1:1 Acetone/Water | 1 mo. | OK[1] | 3 weeks membrane shrinking[2] |
| n-Butanol | 1 mo. | OK[1] | 3 weeks membrane shrinking[2] |
| Ethyl acetate | 1 mo. | OK[1] | shrivels instantly |
| Tetrahydrofuran | 1 mo. | OK[1] | dissolves instantly |
| Toluene | 1 mo. | OK[1] | shrivels instantly |

TABLE 8-continued

| Exposure Chemical | Poly(vinylidene fluoride) | | Polysulfone |
|---|---|---|---|
| Chlorobenzene | 1 mo. | OK[1] | dissolves instantly |

[1] No significant change in flux or in retention of Carbowax 20M.
[2] Membrane shrank ~5% and could not be sealed in test cell adequately for testing.

DISCUSSION

Process Requirements

As previously stated, the concentration of the resinous, filmforming polymer dissolved in the solvent-nonsolvent mixture ranges from about 12 to about 35 weight percent. The optimum concentration of the resinous polymer in the solution prior to forming the sheet is about 15-25 percent by weight when the polymer is vinylidene fluoride homopolymer. With copolymers, higher concentrations up to about 30% are preferred. Solution temperatures preferably range from about 50 to about 110° C. but variations in the solution temperature produce no apparent effect on ultrafiltration properties of the membranes. The properties of the membranes are not significantly affected by their formed thickness probably due to the fact that the membranes are asymmetric and ultrafiltration takes place at a very thin "skin" or layer of critical porosity at the top surface, the rest of the membrane being more porous and offering little resistance to flow. The preferred thickness of the prepared porous gel membrane is from about 10 to about 50 mils.

The solvents used for the solutions of this invention, as listed heretofore, include triethyl phosphate, hexamethyl phosphoramide, 1-methyl-2-pyrrolidinone, dimethyl acetamide, dimethyl formamide and propylene carbonate. Of the above mentioned solvents, triethyl phosphate is preferred because membranes formed with its use are smoother. That is, vinylidene fluoride polymer membranes prepared from casting solutions containing triethyl phosphate as the solvent and one of the specified non-solvents of this invention do not require taping or restraining of the edges of the sheet during the gelation step and are smooth, unwrinkled membranes which have not shrunk unevenly during processing. When utilizing triethyl phosphate as the solvent it is generally used in an amount ranging from about 65 to about 80 weight percent, preferably from about 70 to 79 percent. The remaining specified solvents are used generally in the same amounts.

The non-solvent component of the sheet-forming system is the most critical element in the process for obtaining the desired pore formation and there is no obvious rationale for choosing the optimum non-solvent. The non-solvent should be soluble in and compatible with the solution of polymer in the specified solvent; it should be soluble in the gelation medium (water); and it should be less volatile than the solvent. The latter condition is desirable but not essential. However, there are a large number of non-solvents which meet these conditions. Some of these non-solvents have been tried, and a significant variation in permeability of the resulting membranes has been found. Membranes prepared with glycerol and with phosphoric acid have the highest permeability while still retaining macromolecular solutes. Glycerol has been found to be an effective non-solvent (pore producing agent) at various concentrations and therefore is the preferred non-solvent.

The vinylidene fluoride polymer dissolved in the specified solvent-non-solvent medium is cast on a smooth solid surface or substrate. The solvent is then allowed to evaporate from the formed sheet but only to an extent necessary to provide a material which will have the desired porosity after treatment with the gelation medium. Evaporation is generally brought about by exposure of the formed (cast) sheet to air for about 1 to 15, preferably about 5 minutes. The evaporation time can be decreased by increasing the ambient temperature during evaporation. While a portion of the solvent is removed by evaporation, it has been noted that the sheet gains weight by picking up moisture from the air.

The gelation treatment, after the evaporation step, is required to convert the liquid film into a solid membrane. The gelation medium is kept at a temperature ranging from about −10° to about +50° C., preferably 0° to 5° C., and the dwell time for exposure of the sheet to the gelation medium is sufficient to solidify the membrane and preferably at least about 15 minutes.

A stabilizing treatment of the membrane subsequent to the gelation treatment may be provided, if desired. It is preferable to dimensionally stabilize those polymer membranes which tend to shrink on exposure to elevated temperatures to which they may be exposed during use. Stabilization is conveniently carried out by immersing the sheet in warm water ranging in temperature from about 20° to about 100° C. for at least about 1 minute. Maximum shrinkage of the membranes of this invention generally occurs after about 30 minutes at 100° C. Membranes which have been dried following gelation may also be stabilized by subjecting the dried membrane to heat in an oven at the same temperature range as used for the hot water treatment.

The membrane may be dried before or after heat stabilization. It may be dried by merely spreading or hanging the membrane in air at ambient temperature or in an oven at a temperature up to 100° C. The membrane may also be vacuum dried. Alternatively, the membrane may be partially dried by removing surface or excess water and then treating the sheet with a humectant e.g., glycerol, or a surfactant e.g., "Triton X100" or a wetting agent, followed by complete removal of water.

Membranes which have been dried must be rewet to function as a filtration element. Humectant or surfactant impregnated membranes may be rewet when ready for use by treating with water. Membranes which have been dried without the benefit of humectant or surfactant are first treated with a water-miscible, organic liquid or water solution thereof in which the membrane is insoluble. Thereafter, the membrane is washed with water to remove the organic liquid and provide a rewet membrane ready for filtration use.

In the case of ultrafiltration of non-aqueous organic or inorganic liquid media, a dry membrane may be used. Alternatively, a water-wet, gel membrane may be used provided the water is removed by exchange with suitable water miscible exchange liquid.

Membranes prepared with blends of vinylidene fluoride polymer and methyl methacrylate polymer may be beneficially extracted after gelation with acetone or similar solvent to selectively dissolve some of the methacrylate polymer. This treatment is not critical for the preparation of ultrafiltration membranes but appears to increase permeability somewhat. The extraction step is carried out, for example, by immersing the porous membrane in the solvent overnight at room temperature and then thoroughly washing the membrane with distilled water.

The resinous, thermoplastic methyl methacrylate polymer which is useful for the film-forming polymer blend of this invention is a methyl methacrylate homopolymer or a copolymer of at least a major proportion of methyl methacrylate and at least one other copolymerizable monomer including, for example, lower alkyl methacrylates, styrene, alpha methylstyrene and acrylonitrile. The methacrylate polymer is used in the blend in amounts ranging from no greater than about 25 percent, based on the weight of the blend. The vinylidene fluoride polymer component of the blend is either the homopolymer or a copolymer of at least 70 weight percent vinylidene fluoride with tri- or tetrafluoroethylene.

The method of preparing the resinous, thermoplastic vinylidene fluoride and methacrylate polymers is not critical to the process described herein. Emulsion polymerization or suspension polymerization techniques are usually employed.

Blends or alloys of vinylidene fluoride resins and methacrylate resins are prepared by mixing the resins in one of the solvents, e.g. triethyl phosphate and non-solvent liquids listed above in a manner as described for the vinylidene fluoride polymer alone. After gelation of the formed alloy membrane, extraction with acetone may be advantageous to increase permeability.

The porous membranes formed by the process of this invention are successfully and advantageously employed in a pressure activated process for separating components of a solution containing solutes of molecular weight above about 6000. These membranes are especially useful in the ultrafiltration of solutions of thermally-unstable or biologically-active materials since this process for separation does not require heat or exposure to chemical reagents. Furthermore, if the materials to be separated are corrosive or hot, the membranes of this invention can be advantageously employed because they are stable up to about 150° C. and are resistant to many chemicals.

We claim:

1. A process for preparing an ultrafiltration membrane of a resinous, film-forming polymer selected from the group consisting of (a) vinylidene fluoride homopolymer, (b) copolymers of at least 70 weight percent of vinylidene fluoride and up to 30 weight percent tri- or tetrafluoroethylene, and (c) a blend of no less than about 75 weight percent of either (a) or (b) with no greater than about 25 percent of a thermoplastic methyl methacrylate polymer said membrane having a surface layer containing a multiplicity of pores having a diameter within the range of from about 1 to about 100 millimicrons, and a support layer thicker than and having less resistance to fluid flow than said surface layer, said process comprising casting on a smooth solid surface a solution of said resinous, film forming polymer having a polymer concentration ranging from about 12 to about 35 weight percent, about 65 to about 80 weight percent of a solvent selected from the group consisting of triethyl phosphate, hexamethyl phosphoramide, 1-methyl-2-pyrrolidinone, dimethyl acetamide, dimethyl formamide, propylene carbonate and mixtures of said solvents, and from about 1 to about 10 weight percent of a non-solvent for said polymer selected from the group consisting of glycerol, ethylene glycol, phosphoric acid and mixtures thereof, to form a sheet, evaporating a portion of said liquid mixture from said sheet, and contacting said sheet with a liquid gelation medium.

2. The process of claim 1 wherein the resinous, film-forming polymer is vinylidene fluoride homopolymer.

3. The process of claim 1 wherein the resinous, film-forming polymer is a copolymer of at least 70 weight percent of vinylidene fluoride and up to 30 weight percent of tri- or tetrafluoroethylene.

4. The process of claim 2 or 3 wherein the solvent is triethyl phosphate.

5. The process of claim 4 wherein the liquid gelation medium is water.

6. The process of claim 1, 2, 4, or 5 wherein, after the membrane is formed, it is subjected to a heat treatment at a temperature ranging up to about 100° C.

7. The process of claim 1, 2, 3, or 4 wherein the non-solvent is glycerol.

8. The process of claim 4 wherein the cast sheet is contacted with said liquid gelation medium in the absence of physical restraint on the edges of said sheet.

9. The product of the process of claim 8.

10. The product of claim 9 wherein the non-solvent is glycerol.

11. The product of claim 9 wherein the gelation medium is water.

12. The product of claim 9 wherein the membrane is heat stable up to a temperature of about 100° C.

* * * * *